(12) United States Patent
Lawal et al.

(10) Patent No.: US 11,857,921 B2
(45) Date of Patent: *Jan. 2, 2024

(54) PROCESS AND APPARATUS FOR ALKYL HALIDE FUMIGANT RECOVERY AND CONVERSION

(71) Applicant: THE TRUSTEES OF THE STEVENS INSTITUTE OF TECHNOLOGY, Hoboken, NJ (US)

(72) Inventors: Adeniyi Lawal, Livingston, NJ (US); Lin Zhou, Weehawken, NJ (US)

(73) Assignee: The Trustees of The Stevens Institute of Technology, Hoboken, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/892,006

(22) Filed: Aug. 19, 2022

(65) Prior Publication Data

US 2023/0038873 A1 Feb. 9, 2023

Related U.S. Application Data

(63) Continuation of application No. 16/648,632, filed as application No. PCT/US2018/053219 on Sep. 27, 2018, now Pat. No. 11,420,158.

(60) Provisional application No. 62/563,976, filed on Sep. 27, 2017.

(51) Int. Cl.
*B01D 53/18* (2006.01)
*B01D 53/70* (2006.01)
*B01D 53/78* (2006.01)

(52) U.S. Cl.
CPC ............ *B01D 53/70* (2013.01); *B01D 53/18* (2013.01); *B01D 53/78* (2013.01); *B01D 2251/604* (2013.01); *B01D 2252/202* (2013.01); *B01D 2257/2062* (2013.01); *B01D 2258/06* (2013.01)

(58) Field of Classification Search
CPC ........ B01D 53/70; B01D 53/18; B01D 53/78; B01D 2251/604; B01D 2252/202; B01D 2257/2062; B01D 2258/06; B01D 2257/206; A01G 13/00; A61L 9/00; A61L 9/145

See application file for complete search history.

(56) References Cited

U.S. PATENT DOCUMENTS

| | | | | |
|---|---|---|---|---|
| 5,565,178 A | * | 10/1996 | Dove | B01D 53/8671 |
| | | | | 422/177 |
| 5,904,909 A | * | 5/1999 | Yates | B01D 53/70 |
| | | | | 95/131 |
| 11,420,158 B2 | * | 8/2022 | Lawal | B01D 53/70 |
| 2006/0088462 A1 | * | 4/2006 | Joyce | B01D 53/70 |
| | | | | 422/231 |
| 2010/0101412 A1 | * | 4/2010 | Joyce | B01D 53/82 |
| | | | | 95/92 |

FOREIGN PATENT DOCUMENTS

| | | | | |
|---|---|---|---|---|
| CN | 103 638 799 A | * | 3/2014 | |
| JP | 49 035 503 B | * | 9/1974 | |
| WO | WO 2016 137 337 A1 | * | 9/2016 | B01D 53/68 |

* cited by examiner

*Primary Examiner* — Timothy C Vanoy
(74) *Attorney, Agent, or Firm* — Clark Hill PLC; Ralph W. Selitto, Jr.; John K. Kim

(57) ABSTRACT

Process and apparatus (10) are disclosed for capturing and converting an ozone-depleting alkyl halide fumigant from a fumigant/air mixed stream (14) by absorbing it into a metal hydroxide-alcohol buffer solution (26) in an absorber/scrubber (12) to produce a fumigant-free air stream (28). The captured alkyl halide in aqueous alcohol solution can actively react with the metal hydroxide in alcohol solution to produce a value-added product, such as a precipitate metal halide, and another alcohol that further enhances absorption. The absorbing solution is well-mixed with make-up alcohol and alkali streams to maintain the concentration of the metal hydroxide in the desired buffer solution range. The solid precipitate metal halide (52) is separated from the liquid stream, and the metal hydroxide-containing mixed alcohol stream (26) is recycled to the absorber/scrubber (12).

25 Claims, 11 Drawing Sheets

PROCESS AND APPARATUS FOR ALKYL HALIDE FUMIGANT RECOVERY AND CONVERSION

CROSS-REFERENCE TO RELATED APPLICATION(S)

This application is a continuation of U.S. patent application Ser. No. 16/648,632, filed Mar. 18, 2021, now issued as U.S. Pat. No. 11,420,158, which is a national phase entry, under 35 U.S.C. § 371, of International Application No. PCT/U.S.2018/053219, filed Sep. 27, 2018 and entitled "PROCESS AND APPARATUS FOR ALKYL HALIDE FUMIGANT RECOVERY AND CONVERSION", which claims the benefit of and priority to U.S. Provisional Patent Application Ser. No. 62/563,976 filed Sep. 27, 2017, the contents of all of which are fully incorporated herein by reference.

FIELD OF THE INVENTION

The present invention relates to cost-effective processes and apparatus for the treatment of fumigation waste/exhaust gas, and, more particularly, to the recovery of alkyl halide from an air stream containing same and the concomitant conversion of the recovered alkyl halide into useful compounds.

BACKGROUND OF THE INVENTION

Fumigants are used to treat agricultural products, such as fruits, grains or logs, in enclosures before these products are allowed to be exported overseas, imported or distributed locally. After fumigation, sufficient time elapses for the fumigant to be absorbed by the products. Subsequently, the enclosures are aerated, causing the release of residual fumigant, which can be as high as 50% of the original amount applied, into the atmosphere. Alkyl halides, especially methyl bromide (MeBr), are commonly used fumigants.

Due to its toxicity, methyl bromide is considered to be an effective quarantine/phyto-sanitary fumigant in the control of insects and other pests. However, studies in humans have confirmed acute and chronic health effects associated with methyl bromide, and the EPA has classified methyl bromide as a Group D compound. In addition to its toxicity, another serious concern about the use of methyl bromide is the damage it causes to the stratospheric ozone layer. In fact, methyl bromide is considered an ozone-depleting chemical and thus it has been classified as a Class I ozone-depleting substance by the Montreal protocol, while also falling under the Clean Air Act with an ozone depletion potential of 0.2%. As a result, international, federal and state regulations require strict control of methyl bromide emissions because of their hazardous effect on the environment.

Due to the lack of effective alternatives, the use of methyl bromide as a fumigant has not been completely discontinued, but such usage is only permitted if its emissions can be sufficiently reduced. This has an adverse economic impact on, for example, logging companies, which are limited by federal and state regulations on how much of the fumigant they can release into the atmosphere, thus limiting their operations.

Currently, there are methods being implemented on a large scale for capturing fumigants; however, they typically destroy the fumigants, creating by-products and attendant disposal problems. Moreover, they are also expensive. Most of the current methods rely on the use of activated carbon beds, and the absorbing solution is not recoverable. Other shortcomings associated with these current technologies include the following, for example. They involve complicated systems comprising multiple stages, thus requiring high capital investment and operating expense. These technologies often require the modification of existing fumigation processes which may affect the effectiveness and reliability of the processes by, for example, requiring longer processing time per container. The existing emission control methods/processes mainly focus on the capture of the halogenated fumigants using different adsorbents/absorbents, whereby a further treatment process is usually required for the safe disposal of the halogen-containing agents/absorbents, which adds extra costs to the process and makes it less economically favorable. Current treatment systems are typically large which makes their transportation for onsite gas treatment difficult. Existing processes also typically involve extreme treatment conditions of high temperature or energy input.

SUMMARY OF THE INVENTION

The present invention relates to processes and apparatus for capturing and converting fumigants using a reactive absorber/scrubber, which is equipped to circulate an aqueous buffer solution of alcohol and metal hydroxide. Air containing alkyl halide fumigant (i.e., fumigant/air mixture) is then passed through the absorber/scrubber apparatus such that the fumigant/air mixture and the buffer solution come into contact, causing the fumigant to be absorbed by the alcohol and thereby cleaning the air of the fumigant. The captured alkyl halide then reacts with the metal hydroxide to yield a metal halide. A purge stream containing concentrated metal halide solution, or metal halide slurry, is continuously discharged to avoid buildup of solids and contaminants in the system. Upon discharge from the absorber/scrubber apparatus, the solid metal halide will be precipitated and separated from the aqueous alcohol and metal hydroxide solution that remains. After the salt (e.g., metal halide) recovery process, the solution is fed back to the absorber as absorbing solution. In an embodiment, the fumigant/air mixture is processed in continuous mode and the buffer solution is processed in continuous mode but recirculating mode. In an embodiment, the fumigant/air mixture is processed in continuous mode and the buffer solution is processed in batch mode.

DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF EXEMPLARY EMBODIMENTS

The exemplary embodiment disclosed hereinafter, which is only one of many exemplary embodiments of the present invention, was developed for application in the recovery of a substantial amount of the methyl bromide used as the fumigation gas for fumigating logs of wood, followed by its conversion to a value-added product. The waste fumigation gas treated in accordance with the present invention better complies with emission regulations. Although the process and apparatus described below are directed to the recovery and conversion of methyl bromide, it should be understood by a person of ordinary skill in the art that they are also effective for recovering and converting other alkyl halide fumigants.

In the process of the present invention, the scrubbing solution is an alcohol-based buffer solution, which is not discarded, but rather is separated from the produced suspended solid, namely metal halide, and recycled, thereby further enhancing the economic efficiency and viability of the process. All of the reactants for the proposed process are inexpensive compared to existing processes, and metal halides, such as sodium bromide, can be highly valuable commodity products. Another by-product of the process disclosed herein is methanol, a solvent that is also recycled in the absorbing solution to aid further absorption of the fumigant.

The one-step highly integrated wet reactive absorption process as developed herein requires reduced capital and operating cost and mild process conditions in comparison to currently available methods. With intensified mass transfer characteristics, highly efficient waste gas treatment can be achieved with reduction in equipment size, which makes it viable for onsite processing. In addition, the added-value byproduct from this process improves its cost-effectiveness, and makes the fumigant treatment close to being self-sustaining economically.

Figure 1:
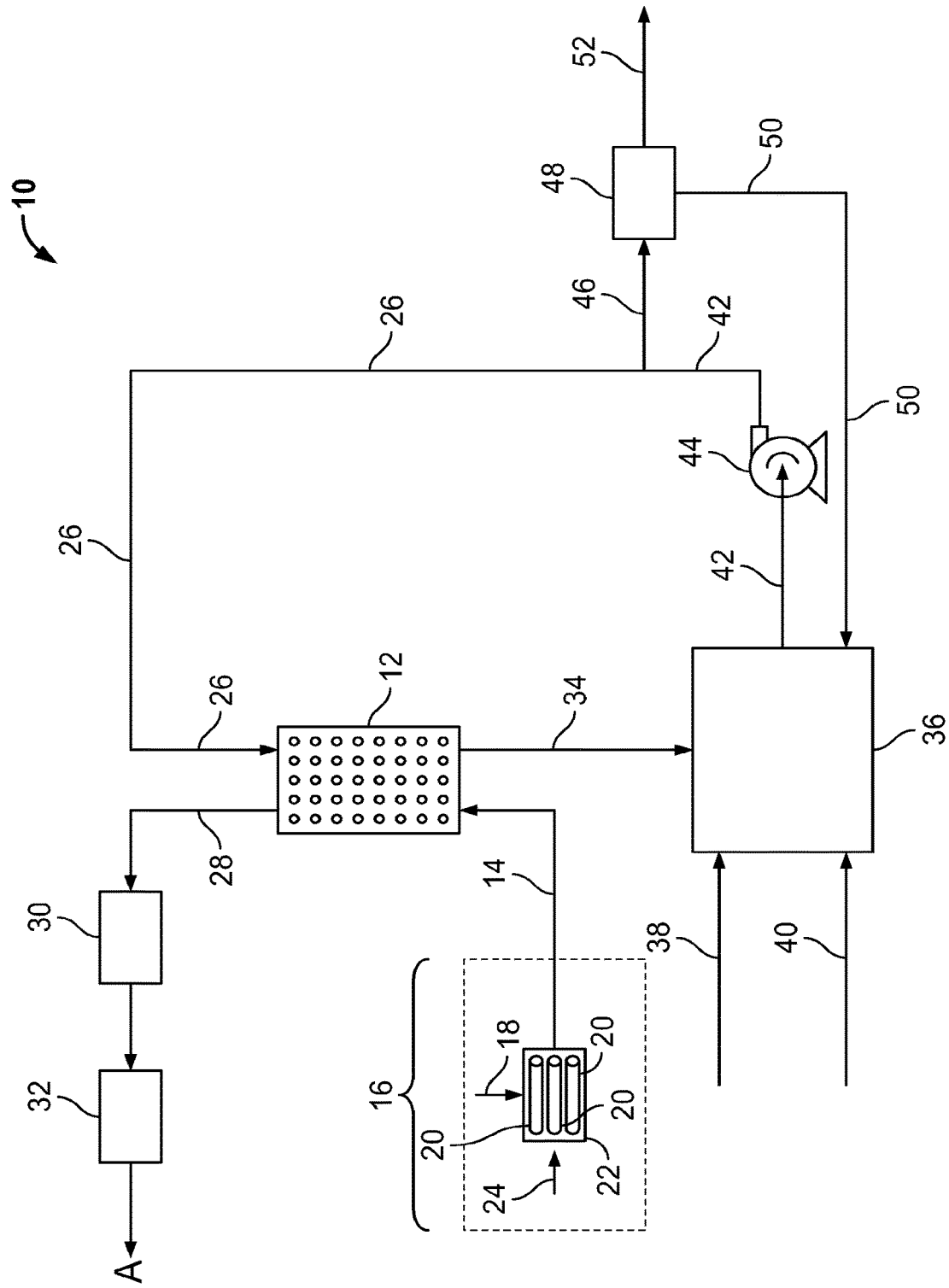
FIG. 1 is a schematic diagram of a process/apparatus, which can be operated in either batch or recirculation mode for recovering and converting an alkyl halide in accordance with the present invention.

While bearing in mind the foregoing prefatory comments, reference is made to FIG. 1, in which apparatus 10 comprises an absorber/scrubber 12, such as Model No. PPS-24 Vapor Scrubber from Vapor Tech, equipped to bring the fumigant gas and dissolved metal hydroxide into contact and thereby enabling their reaction. It should be understood that any absorber or scrubber apparatus known to persons having ordinary skill in the art is suitable for use as the absorber/scrubber 12 of the apparatus 10. For example, in an embodiment, the absorber could be a metallic cylindrical column or tower. In some embodiments, the column could be a packed column, while in others it could be a tray tower. Various packings and trays are available and known and their selection is well within the knowledge of persons of ordinary skill in the art.

With continued reference to FIG. 1, a mixed air stream 14 comprising air and an alkyl halide, such as methyl bromide, is derived from a fumigation process 16 in which an alkyl halide stream 18 has been used to fumigate an agricultural product, such as wooden logs 20, or fruit or grain (not shown), which has been stored in a fumigation container 22. Air 24 is pumped continuously through the fumigation container 22 to aerate the fumigated agricultural products (i.e., the logs 20), as well as the container 22 itself. In other embodiments, the mixed air stream 14 may be derived from other sources and processes besides a fumigation process. The mixed air stream 14 exiting the container 22 carries with it the removed alkyl halide fumigant (e.g., methyl bromide) as it enters the absorber/scrubber 12 from the bottom. During its upward travel, the mixed air stream 14 comes into contact with a counter-current flowing stream of absorbing solution 26 that is fed from the top of the absorber/scrubber 12 and travels downwardly through the absorber/scrubber 12. In another embodiment, the mixed air stream 14 and the stream of absorbing solution 26 can flow through the 10 absorber/scrubber in the same direction.

The stream of absorbing solution 26 is a metal hydroxide-alcohol buffer solution, which functions to enhance the external mass transfer of alkyl halide from the mixed air stream 14 to the absorbing solution, as well as to provide a stable alkyl halide conversion media. The alkyl halide (e.g., methyl bromide) is highly soluble in the absorbing alcohol, thereby facilitating its transfer from the mixed air stream 14 to the absorbing solution. A lean air stream 28 comprising air and a reduced amount of alkyl halide is discharged from the top of the absorber/scrubber 12 and passes through an optional de-entrainment/demi sting device 30 and an in-line alkyl halide detecting/quantification (i.e., measuring) instrument 32 before venting to the atmosphere A.

As the alkyl halide is super active to react with the metal hydroxide in the absorbing solution, two reaction products result from a bimolecular nucleophilic substitution reaction (SN2), wherein the metal is an alkali metal (i.e., sodium, potassium or any of the Group 1 A (1) elements of the periodic table). One reaction product is a product alcohol which corresponds to the alkyl group of the alkyl halide and which is a liquid that is miscible with the absorbing alcohol. The other reaction product is a metal halide which corresponds to the metal of the metal hydroxide and the halide of the alkyl halide and which subsequently precipitates as a solid. The following reaction is the general reaction which occurs:

$$CnH_2n+IX+YOH \rightarrow CnH_2n+OH+YX$$

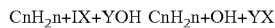

Alkyl Metal Alcohol Metal
Halide Hydroxide Halide

More particularly, where, for example, the alkyl halide is methyl bromide and the metal hydroxide is sodium hydroxide, the reaction will proceed as follows to produce methanol as the product alcohol and sodium bromide as the metal halide:

$$CH_3BR+NaOH \rightarrow CH_3OH+NaBr$$

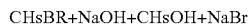

Methyl Sodium Methanol Sodium
Bromide Hydroxide Bromide

Referring still to FIG. 1, stream 34, which contains metal halide and alcohols, is supplied to absorbing solution drum 36 from the absorber/scrubber 12. A small make-up stream 38, which contains absorbing alcohol, is also supplied to the absorbing solution drum 36 to compensate for any absorbing alcohol that may have been lost due to reaction with the product alcohol or evaporation into the air stream or other losses. Similarly, a make-up alkali stream 40, which contains metal hydroxide and alcohol at a certain concentration, is supplied to the absorbing solution drum 36. A discharge stream 42 exits the absorbing solution drum 36 via pump 44. After leaving the pump 44, the stream 42 is divided into the absorbing solution stream 26 and a purge stream 46. The purge stream 46 passes through a solid-liquid separation apparatus 48, such as a Russell Eco Separator, resulting in (i) a stream 50 containing a negligible amount of dissolved salt (e.g., metal halide), which stream 50 is returned to the absorbing solution drum 36, and (ii) collected solids 52, namely metal halide, that can be packed for sale.

The transfer of the alkyl halide fumigant from the mixed air stream 14 to the liquid absorbing solution in the absorber/scrubber 12 takes place primarily on the column packing or trays (not shown) of the absorber/scrubber 12. The absorbing solution typically comprises an alkali-alcohol solution and may, for example, be methanol, ethanol, butanol, isopropanol, or combinations thereof. The mass fraction of the alcohol in the absorbing solvent will vary, in general, but in some embodiments the mass fraction will be from about 0 to about 1. Accordingly, the water content (i.e., aqueous component) of the absorbing solvent ranges from about 0 to about 1. The concentration of metal hydroxide in the absorbing solution will vary, in general, but in some embodiments the concentration will be from about 0 g/100 ml solvent to about 50 g/100 ml of solvent. The flow rate of the absorbing solution stream 26 as it flows into the absorber/scrubber 12 will vary depending on, amongst other things, (i) the concentration of the fumigant in the gas stream, (ii) gas stream flow rate, (iii) the desired fumigant concentration in the outlet gas stream, and (iv) the solubility of the fumigant in the absorbing solution.

The flow rate is determinable by persons of ordinary skill in the art and is typically determined as part of the process design. It is desired that the concentration of fumigant in the lean air stream 28 will be from a trace amount (i.e., in the parts per billion range) to an undetectable amount. The temperature of the absorption column within the absorber/scrubber 12 will be maintained at a value selected to enhance the solubility of the fumigant in the alcohol, and also inhibit evaporation of the solvent into the gas stream. In some embodiments, this temperature will be kept at a value from about room temperature (e.g., about 20° C. to about 26° C.) to about 50° C. The operating pressure in the absorption column will depend on the pressure of mixed air stream 14 and may be higher than atmospheric pressure. In some embodiments, the operating pressure may be at least about atmospheric pressure (e.g., 1 atmosphere, or 14.7 pounds per square inch).

The formed product alcohol will, in general, be miscible with the absorbing solution, and the metal halide will precipitate, thereby facilitating its separation from the product stream of the reactor. For any absorbing solution stream, the concentration of metal hydroxide should be controlled to meet any TSS and TDS specified by the manufacturer of the pump 44, and any associated pipe design specification.

As mentioned, the process of the present invention may be practiced in conjunction with fumigation of agricultural products in various containers or enclosures. In some embodiments, the containers may be sealed shipping containers, trailers, railway cars, mills, and warehouses. The fumigated product may be agricultural products, including wood products such as logs, as well as fruits or grains. The concentration of the fumigant in the mixed air stream 14 exiting the container 22 during aeration will vary with time. In certain embodiments, the concentration will vary from about 0.25 g fumigant/g mixture to about 0.0 g fumigant/g mixture. The flow rate of the air stream 24 will vary depending on the alkyl halide fumigant, and the size of the container 22. In the fumigation of wood products in shipping containers, the air flow rate of the air stream 24 may be as high as 1200 ft³/min at room temperature.

After the liquid level in the absorber/scrubber 12 remains unchanged for some time, gas flow is turned on, and the measuring of time-on-stream commences. The countercurrent flowing stream of absorbing solution 26 and the gas stream to be cleaned provides large contact area and creates a relatively higher concentration difference between the two phases, which is the driving force for mass transfer.

Figure 2:
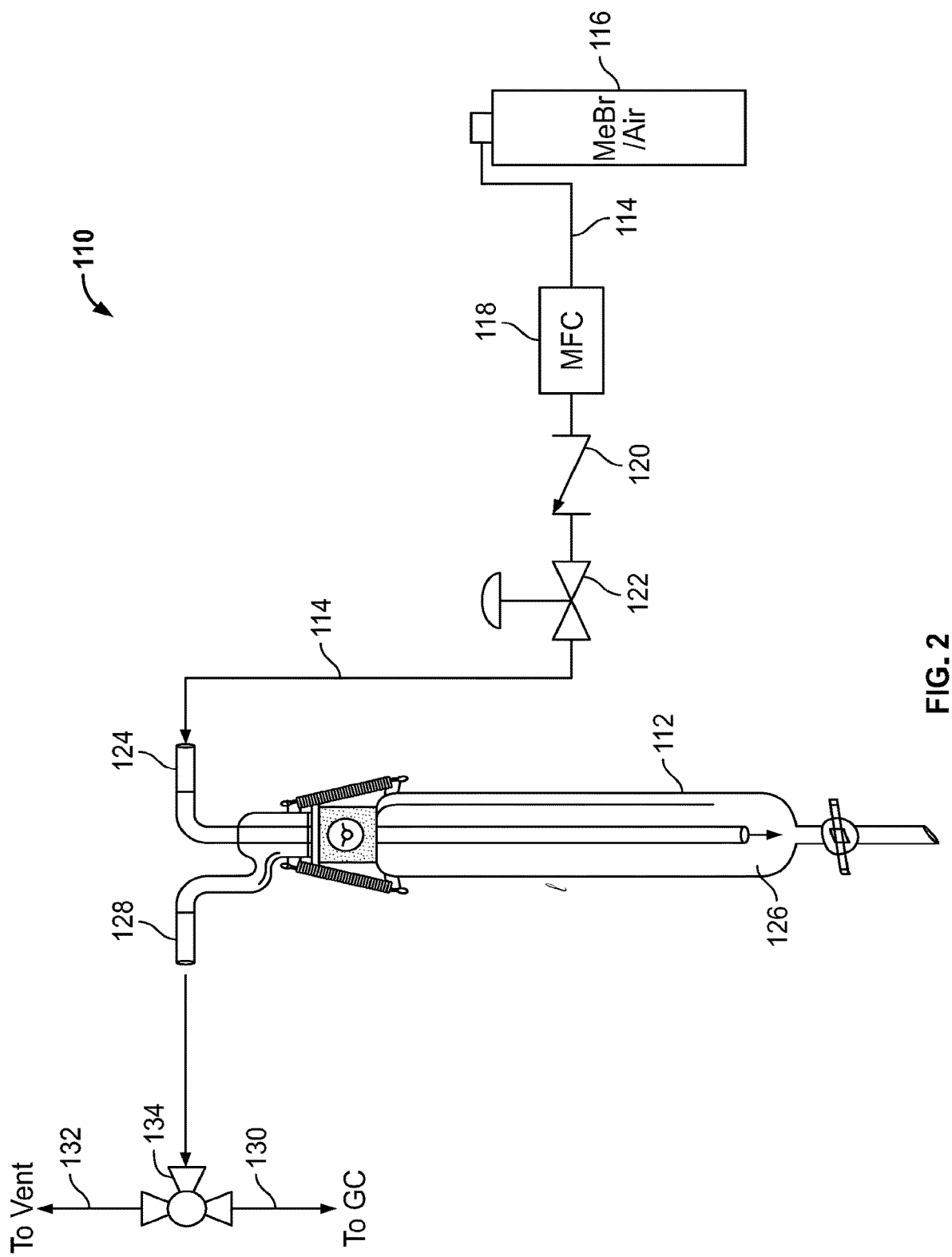
FIG. 2 is a schematic diagram of a batch process/apparatus for recovering and converting an alkyl halide in accordance with the present invention.

FIG. 2 depicts a batch process and apparatus 110 for recovering and converting an alkyl halide in accordance with the present invention. Hereinafter, this setup will be referred to as the Batch Mode Setup. Raschig rings (PTFE, L×O.D.×thickness of 3 mm×3 mm×1 mm) are packed into an absorber 112 to a height of 6". After such packing, 50 ml of absorbing/reaction solution is first transferred into the reservoir of the Batch Mode Setup, and the time-on-stream is measured from the time the gas flow is turned on. A stream of MeBr-rich gas 114 flowing from gas source 116 is regulated by a mass flow controller 118 (MFC) and passes through check valve 120 and control valve 122 on its way to an inlet 124 of the absorber 112. The MeBr-rich gas stream 114 is supplied to a bottom portion 126 of the packed bed, and bubbles through the flooded packed bed before exiting through outlet 128 and then passing through a gas chromatography setup 130 or vent 132 via valve 134.

Figure 3:
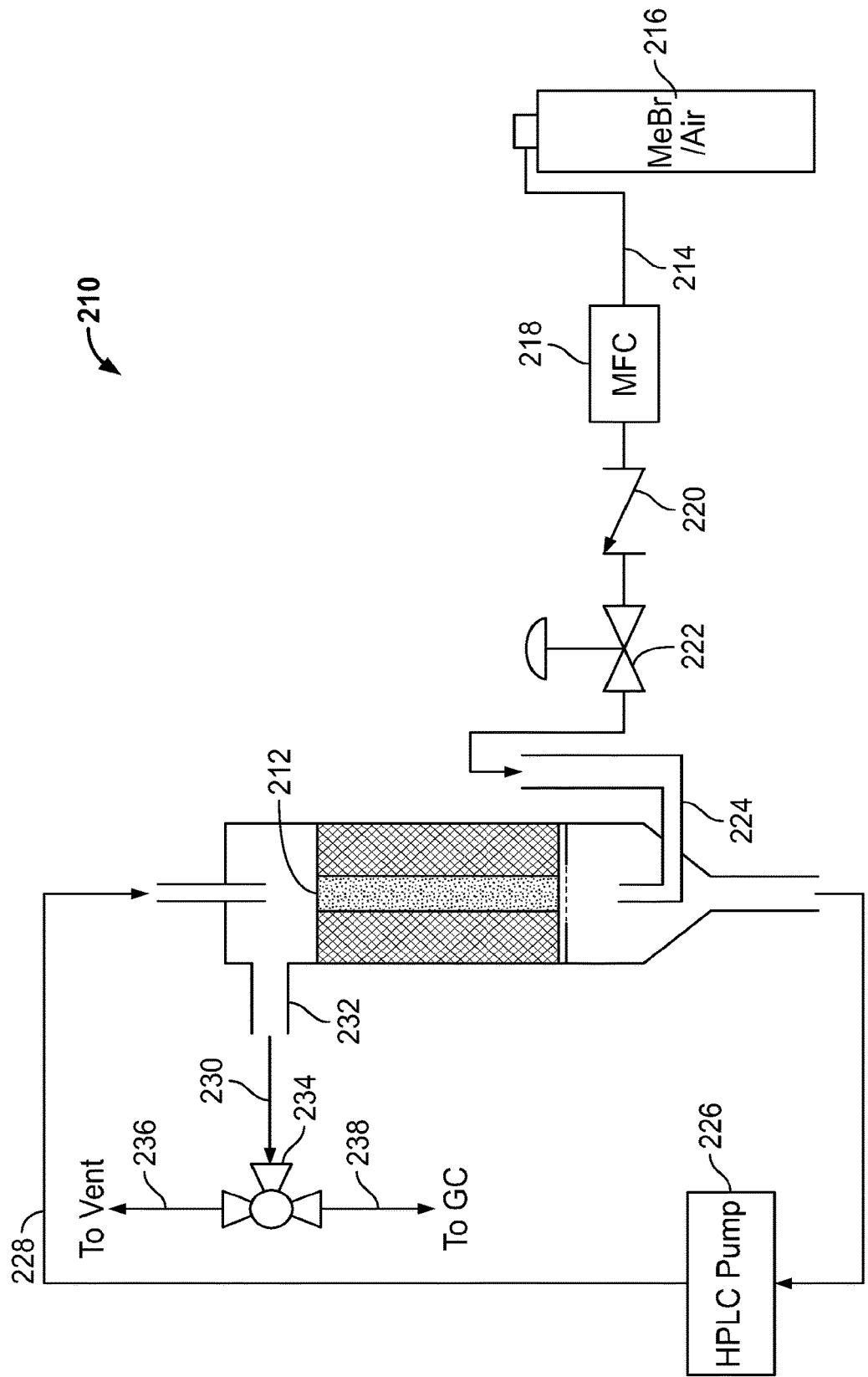
FIG. 3 is a schematic diagram of a recirculation process/apparatus for recovering and converting an alkyl halide in accordance with the present invention.

FIG. 3 depicts a schematic diagram of apparatus 210 which can be operated as a batch or recirculation process for recovering and converting an alkyl halide in accordance with the present invention. Hereinafter, this setup will be referred to as the Recirculating Mode Setup. As shown in FIG. 3, the effective flow path of the absorber/reactor section 212 of the Recirculating Mode Setup has an ID of ¼", a height of 21.26" (54 cm) and is packed with 3 mm Raschig rings (PTFE, L×O.D.×thickness 3 mm×3 mm×1 mm). After such packing, 20 ml of solution is first transferred into the Recirculating Mode Setup and then circulated at a selected flow rate for the absorption process. A stream of MeBr-rich gas 214 flowing from gas source 216 is regulated by mass flow controller (MFC) 218 and passes through check valve 220 and control valve 222 on its way to an inlet 224 of the absorber 212. High-pressure liquid chromatography pump 226 drives the fluid flow. After the liquid level at the bottom of the absorber 212 remains unchanged for 10 min, gas flow is turned on, and the measuring of time-on-stream commences. The countercurrent flow of absorbing solution 228 and the gas stream to be cleaned provides large contact area and creates a relatively higher concentration difference between the two phases, which is the driving force for mass transfer. Gas 230 exits the absorber 212 through outlet 232 and then passes through a gas chromatography setup 238 or vent 236 via valve 234.

In order to describe the invention in more details, the following examples are set forth:

Example 1 Batch Mode Operation: Effect of Packing

Figure 4:
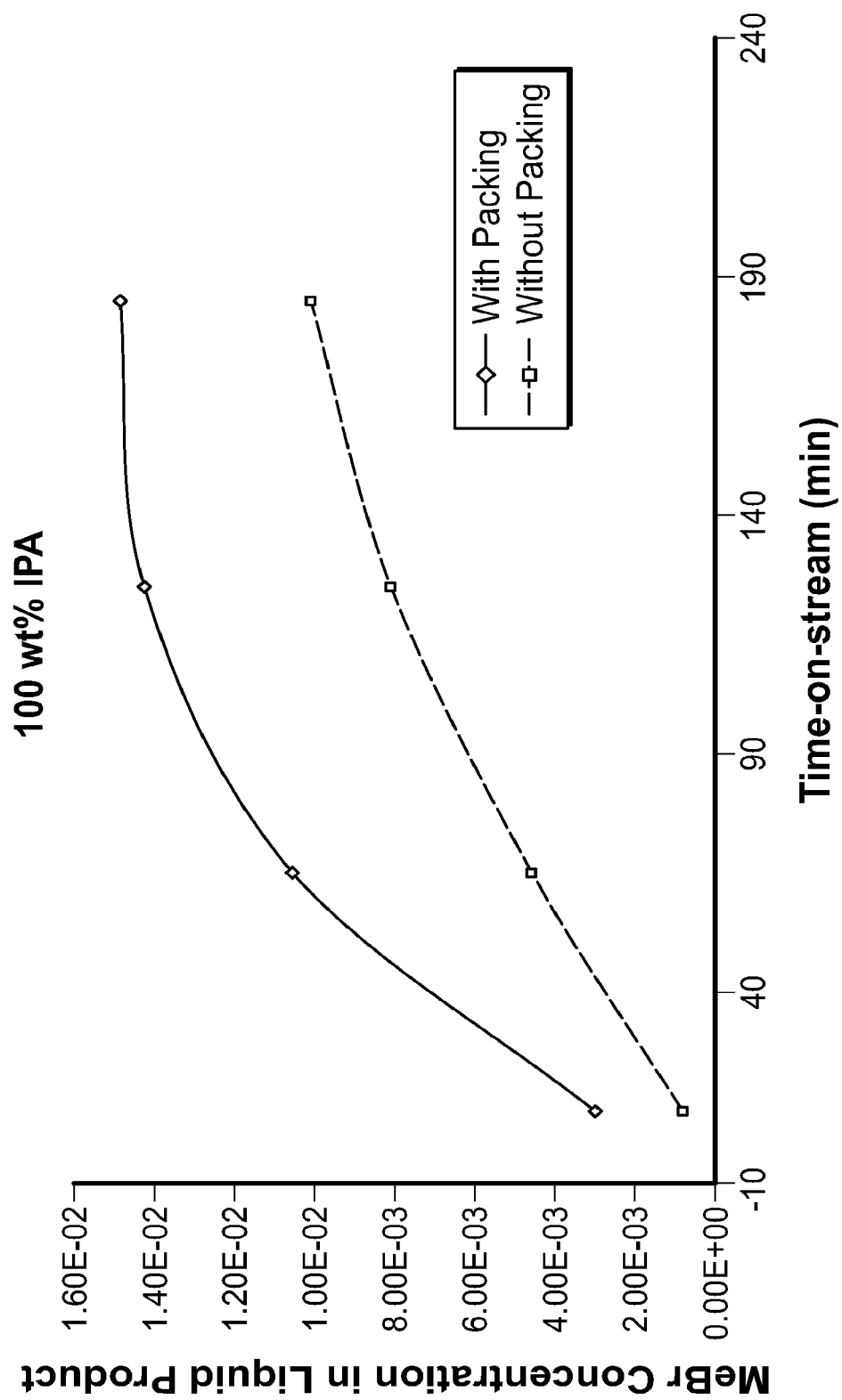
FIG. 4 is a graph showing the results of a study on the effect of packing on halide absorption in the batch mode depicted in FIG. 2, wherein the x-axis corresponds to the time-on-stream and the y axis represents MeBr concentration in the liquid product, for scenarios both with and without packing.

The effect of packing (FIG. 4) on halide absorption was studied in the Batch Mode Setup using pure IPA (Isopropyl Alcohol), and the MeBr concentration in the liquid phase was measured. The liquid phase MeBr concentration was found to rapidly increase during the first 2 hours TOS (Time-On-Stream) for both cases, but at a much faster rate when using packing. With packing, the MeBr concentration approaches a stable value starting from the second hour and appears to reach that value, considered to be the maximum absorbing capacity of the solvent, at about the third hour of the process. The packing provides large interfacial contact area between the gas and liquid, by breaking the gas bubbles, the effect of which is the enhancement of inter-phase mass transfer. Therefore, packing materials with high specific surface area per unit volume can be used to improve the process efficiency for the capture of MeBr by the liquid phase.

Example 2 Batch Mode Operation: Base Solvent Screening

Figure 5:
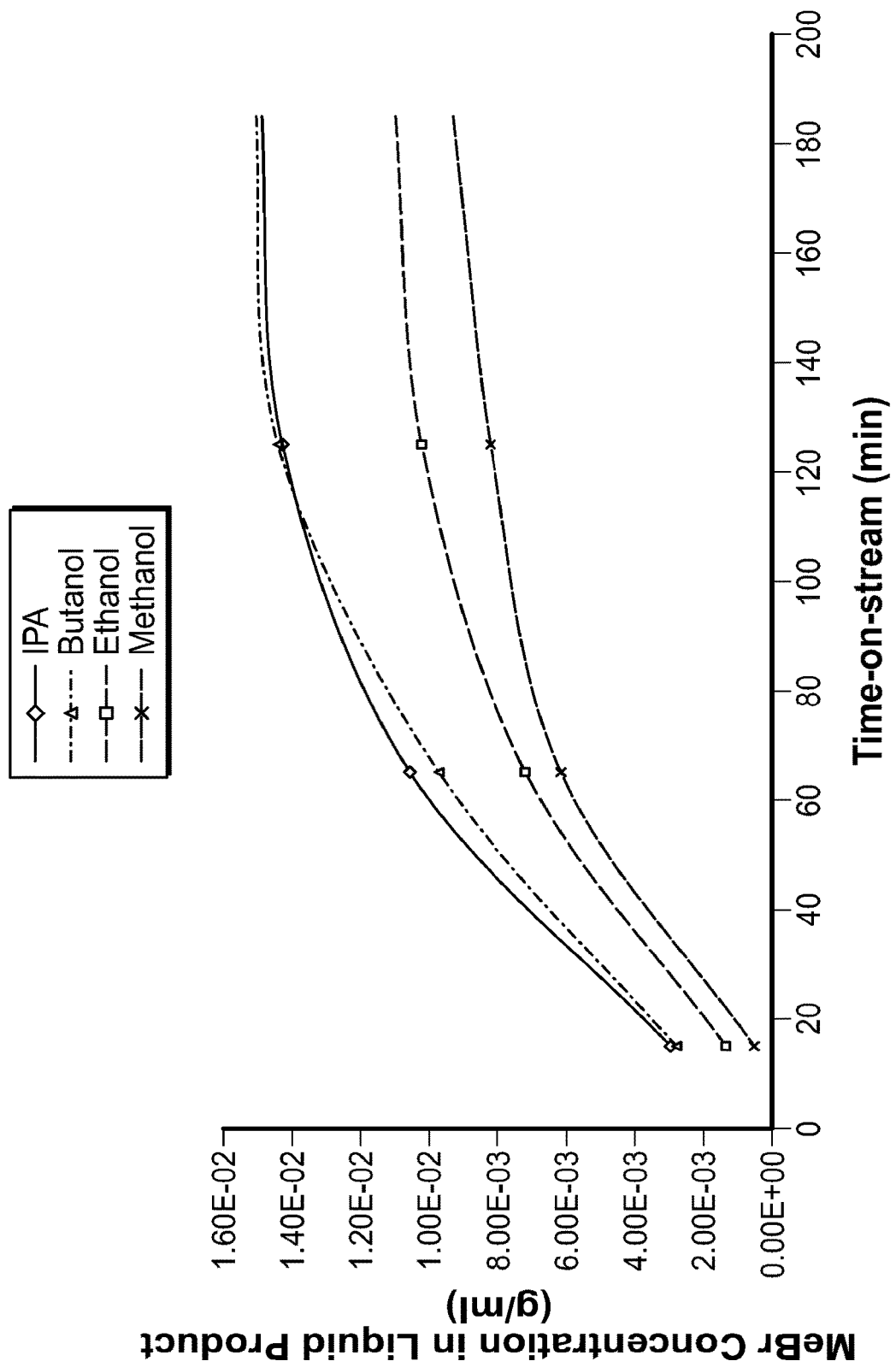
FIG. 5 is a graph depicting the results of a study on the absorbing capacity of various solvents, by plotting the MeBr concentration of the liquid product (see the y-axis) of various alcohol solvents as a function of time (see the x-axis)

The data shown in FIG. 5 were collected from a set of experiments conducted in the Batch Mode Setup. The higher the number of carbon atoms, or molecular weight, or boiling point of the solvent, the higher is its absorbing capacity. Since Butanol is much more expensive than the other three solvents, based on cost considerations, IPA will likely be the most viable solvent.

Example 3 Batch Mode Operation: Metal Hydroxides Screening

The MeBr-rich liquid solution cannot be directly disposed of without incurring significant cost, effort was also made to develop a green process. Therefore, the captured MeBr can either react with the metal hydroxide (YOH) by mixing the MeBr-rich liquid solution with YOH in a separate vessel, or it can be directly reacted with YOH during absorption which may even enhance absorption because of the concomitant preservation of driving force for mass transfer.

The present invention adopts the latter approach. The two most commonly used YOH (i.e., NaOH and KOH) were used to investigate the effect of the addition of YOH on the capture and conversion process in the Batch Mode Setup.

According to Table 1, NaOH is generally much more soluble in water than in alcohols. Therefore, pure DI-H20, and DI-H20/alcohol mixture were first studied as the base solvent. For the latter mixture, because of the formation of two phases, an aqueous phase that contains almost all the NaOH, and the alcohol phase that contains little NaOH, this solvent system exhibited much lower absorbing capacity than the alcohol-based systems, as shown in FIG. 6.

Table 1: Solubility of YOH in different solvents
NaOH (g/100 ml solvent) KOH (g/100 ml solvent)
Water 111 112
Methanol 23.8 43.4
Ethanol «13.9 40 or 30.5
IPA 11

Figure 6:
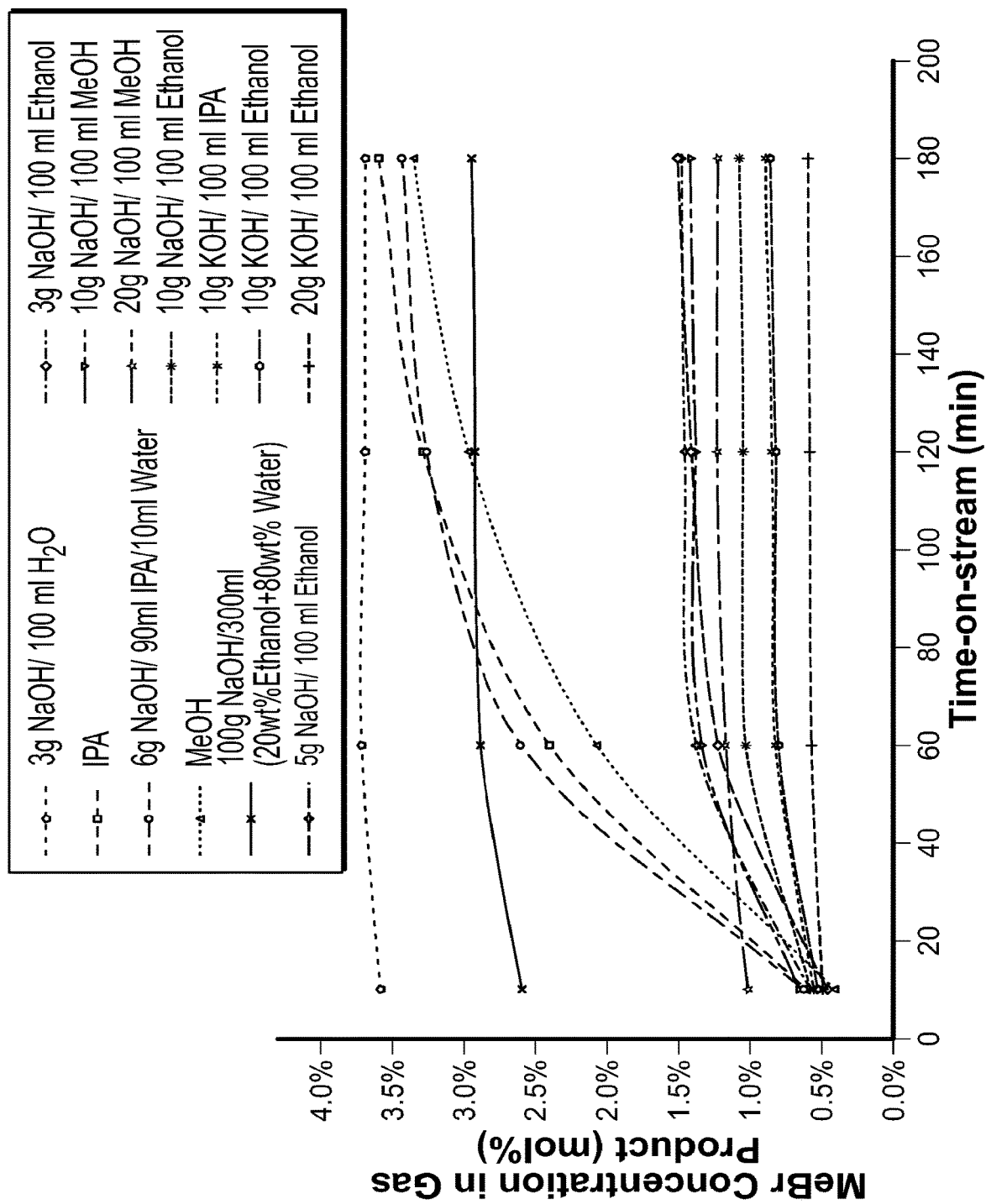
FIG. 6 is a graph illustrating the impact of the concentrations of two common metal hydroxides on the absorbing capacity of various solvents, by plotting the resultant MeBr concentration in the gas product (see the y-axis) as a function of time (see the x-axis) for various hydroxides and concentrations.

The results for all the solutions tested are presented in FIG. 6, and were obtained from the Batch Mode Setup. For alcohol-based solutions, the increase of YOH concentration can greatly enhance the absorbing capacity. The results also reveal that the KOH is more active than NaOH, and ethanol appears to be the best solvent among all studied solvents when YOH is added.

Figure 7:
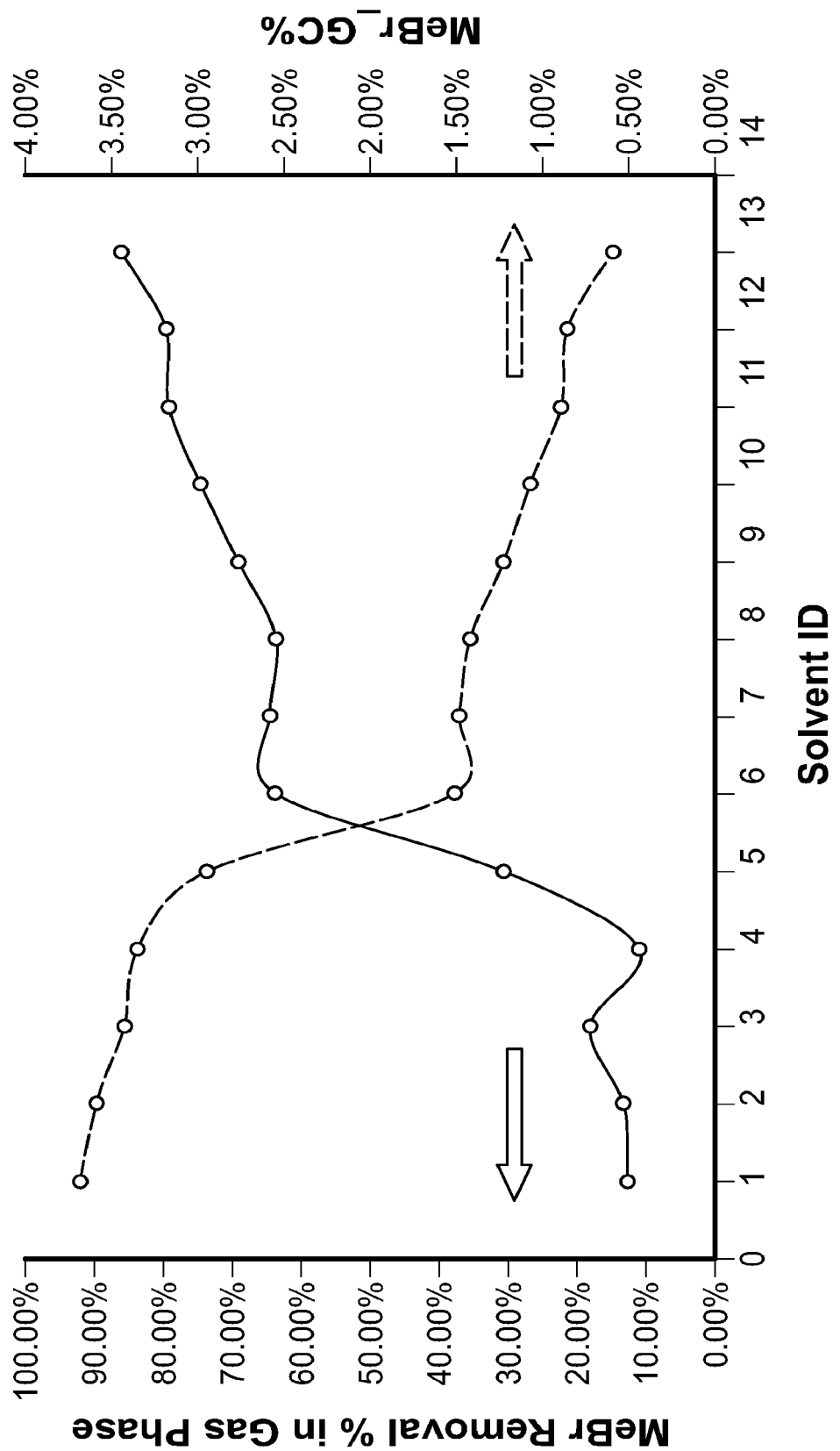
FIG. 7 is a graph depicting the stabilized values of MeBr removal (in percentage) from the gas phase (see the left-hand y-axis) and the MeBr concentration in MeBr-depleted gas (see the right-hand y-axis) for the numbers (see the x-axis) associated with the solutions specified in Table 2 below.

The stabilized values of % removal of MeBr from gas phase and the MeBr concentration in the MeBr-depleted gas using different absorbing solutions were corrected to account for the effect of solvent vapor pressure, and the results summarized in FIG. 7 and Table 2. The most effective absorbing solution is 20 g KOH/100 ml Ethanol.

Table 2: Solvent ID reference
MeBr Removal % MeBr_GC %
Solvent ID Solution composition in Gas Phase:
 1 1.5 g NaOH+50 ml Water 12.67% 3.69%
 2 250 ml IPA 13.35% 3.59%
 3 3 g NaOH+45 ml IPA+5 ml H2O 18.15% 3.43%
 4 50 ml MeOH 11.06% 3.35%
 5 16 g NaOH+38 ml Water+12 ml Ethanol 30.76% 2.95%
 6 1.5 g NaOH+50 ml Ethanol 63.85% 1.51%
 7 2.5 g NaOH+50 ml Ethanol 64.64% 1.48%
 8 5 g NaOH+50 ml MeOH 63.65% 1.42%
 9 10 g NaOH+50 ml MeOH 69.18% 1.22%
 10 5 g NaOH+50 ml Ethanol 74.64% 1.07%
 11 5 g KOH+50 ml IPA 79.24% 0.89%
 12 5 g KOH+50 ml Ethanol 79.62% 0.86%
 13 10 g KOH+50 ml Ethanol 86.12% 0.59%

Example 4 Recirculating Mode Operation: Formation of Suspended Solids

The major challenges for the recirculation test were from the precipitation of solids due to (i) the formation of lower solubility products (from the reaction of YOH and MeBr) as well as (ii) the loss of alcohol solvents at high gas flow rates when no make-up alcohol solution was added to the system. Tests with IOg and 20g KOH/100 ml Ethanol at 5 ml/min recirculation rate and 40 seem air flow rate (without MeBr) revealed that there was no KOH or NaOH in the precipitates which indicates that the precipitates are the products from the reaction of the YOH with MeBr.

Example 5 Recirculating Mode Operation: Effect of Gas-Liquid (G-L) Contact Time

Figure 8:
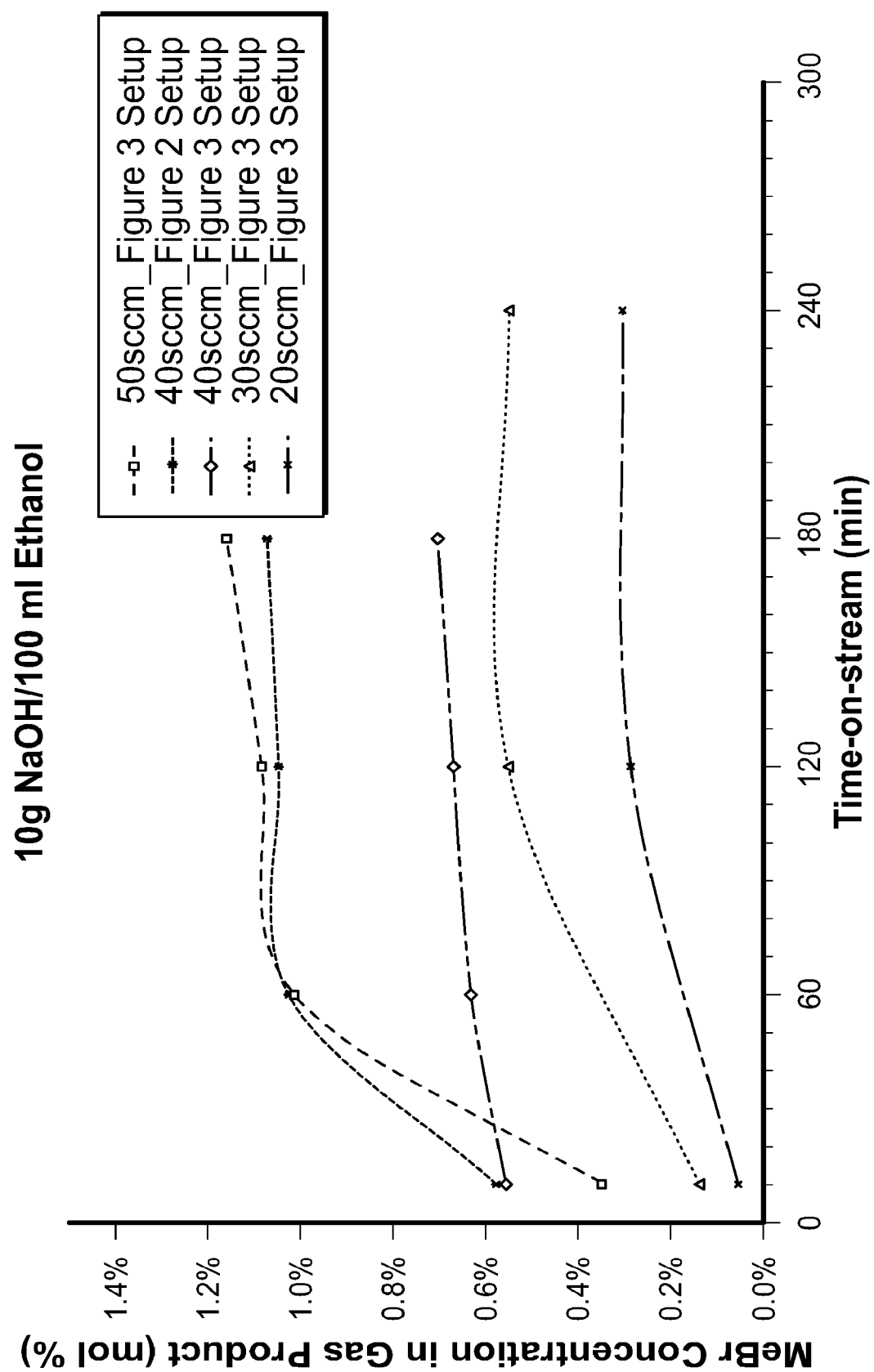
FIG. 8 is a graph showing the results of a study on the effects of gas-liquid (G-L) contact time on MeBr absorption by plotting MeBr concentration in the gas product (see the y-axis) as a function of time (see the x-axis) for varying gas-liquid contact times, in the recirculation mode depicted in FIG. 3.

The effect of G-L contact time in the Recirculating Mode Setup was experimentally studied by keeping the absorbing solution in batch mode. The results are summarized in FIG. 8. It should be noted that, although there was a lag in the measurement of the 20 seem and 30 seem experiments, since the solution concentration was far in excess and approximately constant, the decrease of solution volume in the absorber was negligible (as there was solution above the packing, and the packing was always immersed in the solution), the gas composition at the top surface of the solution can remain constant during the 3-hour duration of the experiment. Therefore, the data reported in the second plot for the 20 seem and 30 seem results can be considered the real performance data.

As expected, the decrease in gas flow rate can effectively decrease the amount of MeBr in the gas exit stream, and the best result was 0.3 mol % at 20 sccm. Compared with the set of experiments conducted in the Batch Mode Setup (depicted in FIG. 2), where the exit gas composition was in the range of 1.05-1.07 mol %, the MeBr composition reduced to 0.67-0.7 mol % at 40 sccm. This reduction can be attributed to the reduced ID and increased length of the absorber.

Example 6 Recirculating Mode Operation: NaOH/H$_2$O Solution as Model Solvent

In order to study the performance of the process with the absorbing solution in recirculation mode while avoiding the pump blockage problem, 20 g NaOH/100 ml H2O solution was used.

Figure 9:
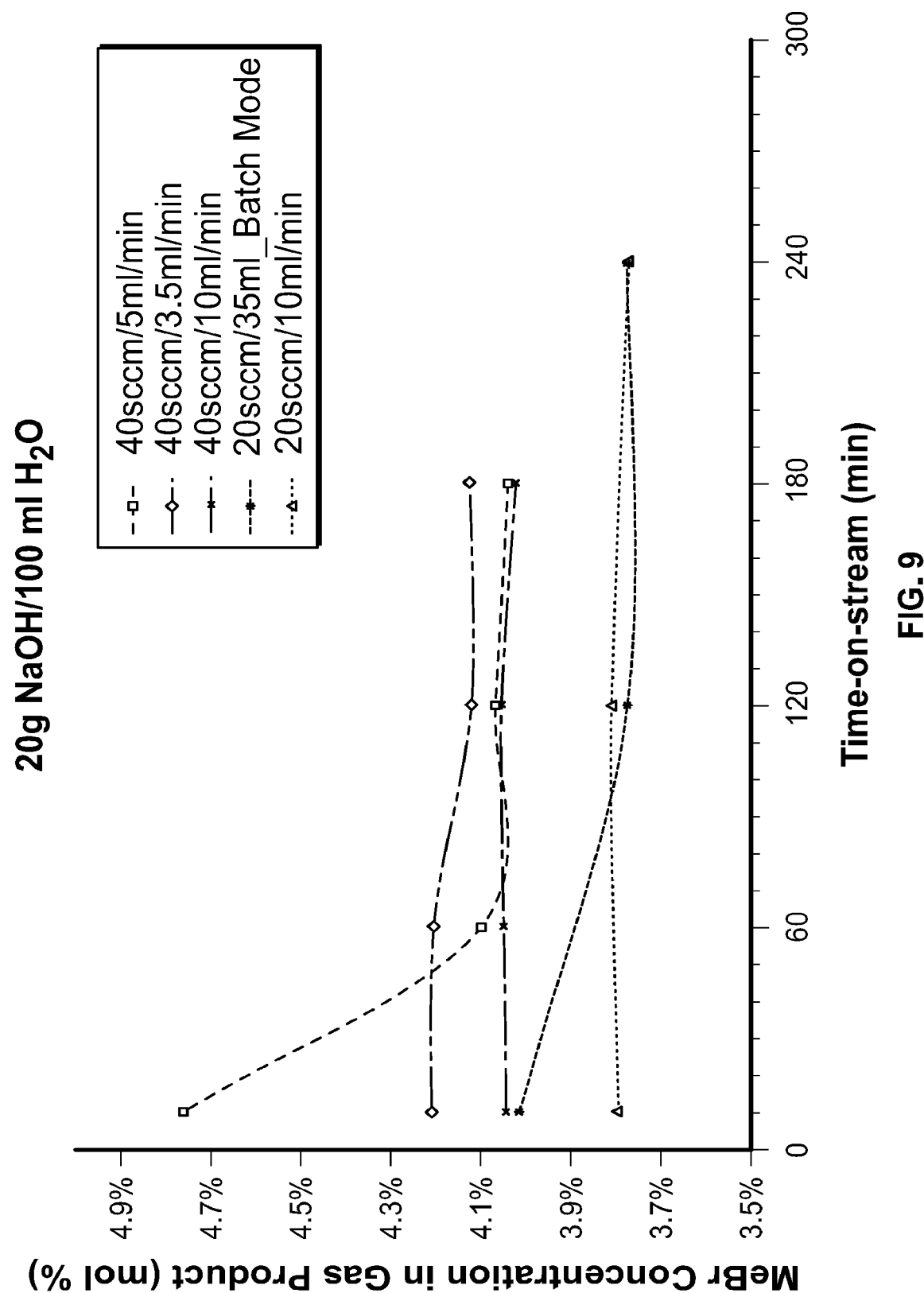
FIG. 9 is a graph illustrating the effect of superficial gas velocity (or residence time) on absorption in the recirculation mode depicted in FIG. 3 by plotting MeBr concentration in the gas product (see the y-axis) as a function of time (see the x-axis) for multiple flow rates.

As shown in FIG. 9, at 40 sccm MeBr/Air flow rate, liquid (20 g NaOH/100 ml H2O) flow rate was increased from 3.5 ml/min to 10 ml/min. The results show that the 5 ml/min liquid flow rate is sufficient for achieving complete wetness of the absorber packing in the recirculation mode. At 10 ml/min, the gas flow rate was reduced to 20 sccm. As expected, the MeBr mol % in gas phase was reduced compared to that at 40 sccm. The experiment was also run at 20 sccm with 35 ml solution but in non-recirculating (batch) mode. Compared with the 20 sccm/10 ml/min run, it seems the mixing due to the recirculation of liquid phase can be compensated for by the gas flow. For the comparison of batch mode and recirculation mode, based on the water recirculation results, there appears to be no difference for batch mode and recirculating mode at a liquid flow rate of 10 ml/min, although more experimental runs will be needed to confirm this observation. Also, although this may not be applicable for the YOH/Ethanol system, it should be noted that the recirculation mode requires only 20 ml (or even less) of solution, while the batch mode requires 35 ml solution, for capturing and converting similar amounts of MeBr. Furthermore, for practical operation, it is better to run in recirculation mode, which will enable the stream exiting the slurry reservoir to be passed into a precipitator for removal of the solid (salt) product, and add a make-up ethanol (or solvent) stream to the process stream after it exits the precipitator. The 20 sccm/35 ml result of 3.78 mol % is worse than that from the 40 sccm/50 ml (3 g NaOH/100 ml H2O) result of 3.69 mol % (FIG. 2 Batch Mode Setup), even with the NaOH concentration increased to 20 g NaOH/100 ml H2O. The main reason is that the superficial residence time in the Recirculating Mode Setup (FIG. 3) is 1/3.2 that of the Batch Mode Setup (FIG. 2).

Example 7 Recirculating Mode Operation: YOH/Alcohol Solution

Figure 10:
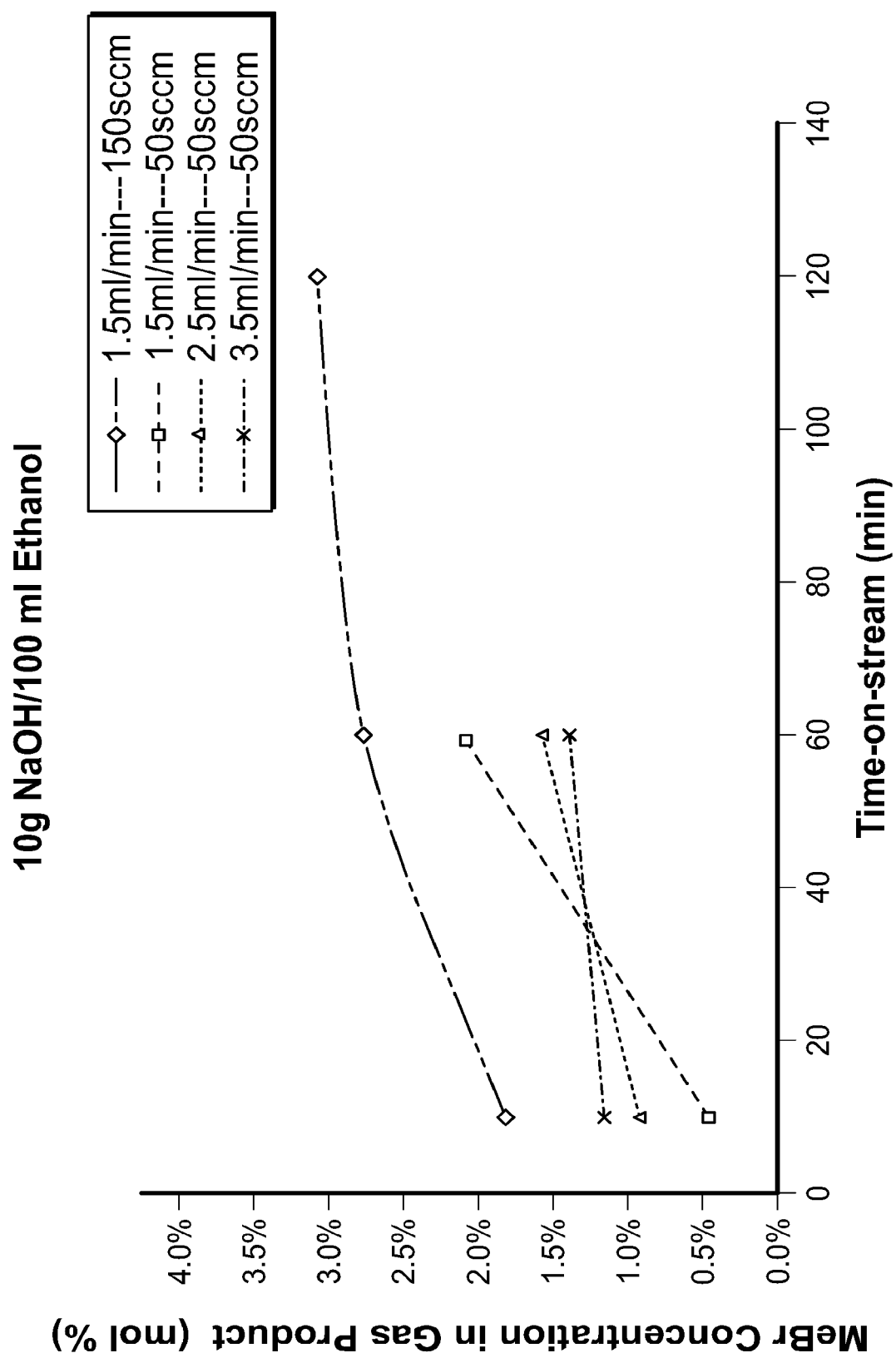
FIG. 10 is a graph showing the effect of varying gas/liquid ratios and flow rates on absorption for IOg NaOH/100 ml Ethanol solution by plotting MeBr concentration of the gas product (see the y-axis) against time (see the x-axis) for varying gas/liquid ratios and flow rates.

The YOH/alcohol solution cannot be successfully processed in recirculating mode for 3 hours due to the formation of precipitates which clog the pump. For the IOg NaOH/100 ml Ethanol solution, experiments were run (FIG. 10) at different gas/liquid ratios while fixing the gas flow rate at 50 sccm. As expected, the MeBr concentration in the exit gas stream decreases with the increase of L/G ratio, due to a higher coverage of the cross-section of the packing bed and increased liquid residence time.

Figure 11:
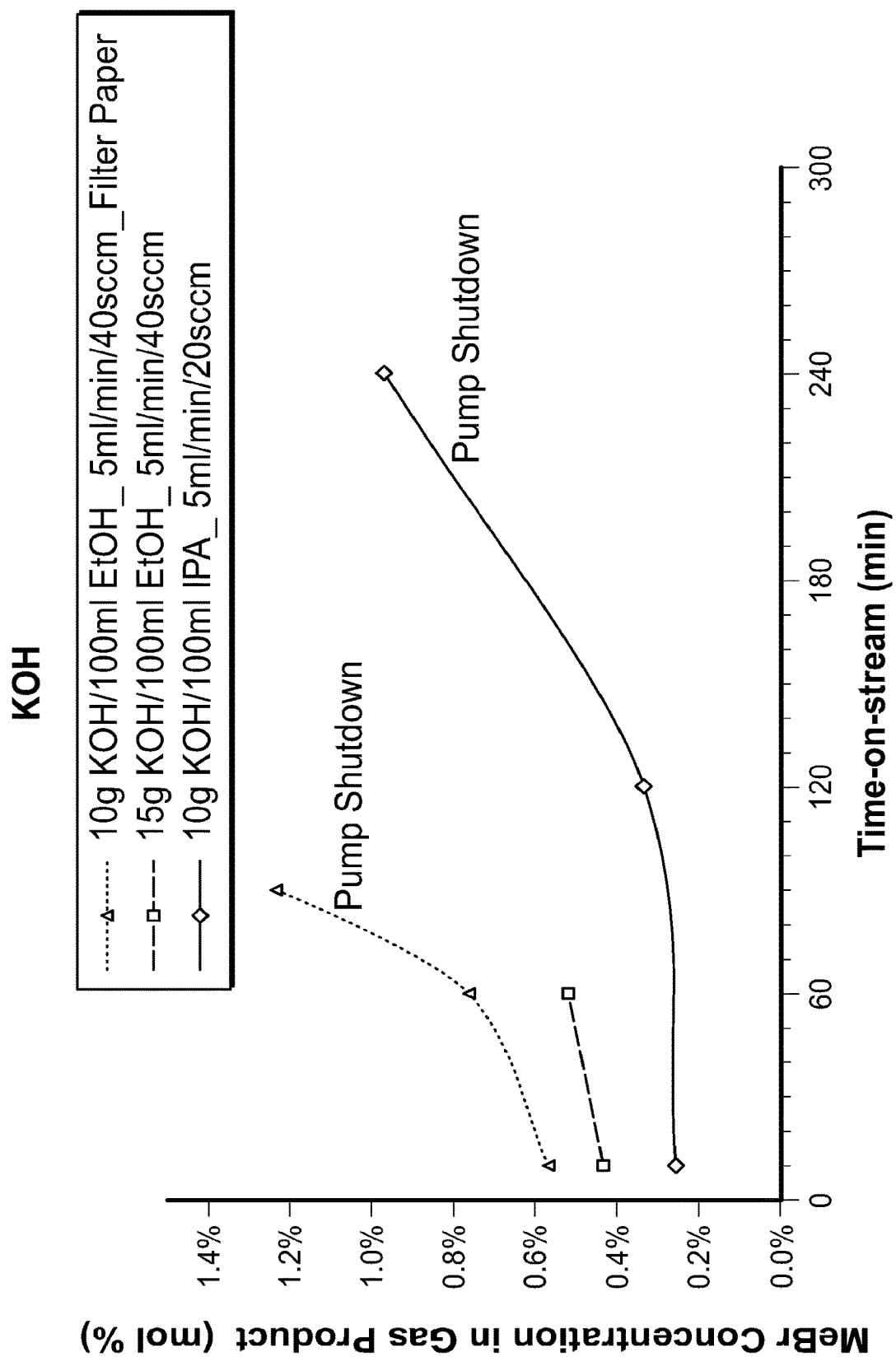
FIG. 11 is a graph depicting the effect of varying gas/liquid ratios and flow rates on absorption for IOg KOH/100 ml ethanol solution by plotting MeBr concentration of the gas product (see the y-axis) against time (see the x-axis) for varying gas/liquid ratios and flow rates.

In addition to the data presented in FIG. 11, 20 g KOH/100 ml Ethanol at flow rates of 5 ml/min and 10 ml/min was also tested, but the experiment had to be suspended because the pump pressure was too high (>1600 psi) even after only 5 minutes of recirculation. The liquid flow rate was fixed at 5 ml/min based on the previous experimental results using water. When the liquid flow rate was set to 10 ml/min, the pump pressure rose to a value >1600 psi very quickly. The observations shown in FIG. 11 confirm the previous conclusion that higher YOH concentration enhances the MeBr capture, and ethanol exhibits better performance than IPA.

It will be understood that the embodiments described herein are merely exemplary and that a person of ordinary skill in the art may make many variations and modifications without departing from the spirit and scope of the invention. All such variations and modifications are intended to be included within the scope of the invention as defined in the following claims.

What is claimed is:

1. A process for capturing and converting fumigants using an absorber/scrubber apparatus, said process comprising the steps of:
   a) feeding an alcohol and metal hydroxide buffer solution into said absorber/scrubber apparatus;
   b) continuously feeding an alkyl halide fumigant/air mixture into said absorber/scrubber apparatus such that said alkyl halide fumigant/air mixture contacts said alcohol and metal hydroxide buffer solution, wherein at least a portion of a fumigant component of said alkyl halide fumigant/air mixture transfers from said alkyl halide fumigant/air mixture to said alcohol and metal hydroxide buffer solution to thereby create a reaction by which, said fumigant component reacts with a metal hydroxide component of said alcohol and metal hydroxide buffer solution to yield a second mixture comprising product alcohol, unreacted metal hydroxide, and a metal halide;
   c) feeding said second mixture from said absorber/scrubber apparatus to an absorbing drum and combining it with a small make-up stream, which contains absorbing alcohol, and a make-up alkali stream, which contains metal hydroxide and alcohol at a certain concentration, to form a discharge stream;
   d) dividing said discharge stream into a purge stream, comprising said unreacted metal hydroxide, said product alcohol and said metal halide, and an absorbing solution stream;
   e) separating said metal halide from said purge stream to yield solid metal halide, wherein said dividing and separating steps are performed continuously and in conjunction with steps a)-c); and
   f) recirculating said absorbing solution stream into said absorber/scrubber apparatus, wherein said absorbing solution stream is used as said alcohol and metal hydroxide buffer solution during the repetition of step a).

2. The process of claim 1, further comprising the step of discharging a treated lean air stream to post-processing equipment and measuring instrument for emission to atmosphere.

3. The process of claim 1, wherein said alcohol component of said alcohol and metal hydroxide buffer solution includes two alcohols.

4. The process of claim 1, wherein said alkyl halide is methyl bromide.

5. The process of claim 1, wherein said alkyl halide fumigant/air mixture is fed into said absorber/scrubber apparatus in a first direction and said alcohol and metal hydroxide buffer solution is fed into said absorber/scrubber apparatus in a second direction, which is opposite said first direction.

6. The process of claim 1, wherein said alcohol component of said alcohol and metal hydroxide buffer solution comprises an aqueous alcohol.

7. The process of claim 1, wherein said alkyl halide fumigant/air mixture is fed into said absorber/scrubber apparatus in a first direction and said alcohol and metal hydroxide buffer solution is fed into said absorber/scrubber apparatus in a second direction, which is the same as said first direction.

8. The process of claim 1, wherein said metal hydroxide component of said alcohol and metal hydroxide buffer solution comprises sodium hydroxide.

9. The process of claim 1, wherein said metal hydroxide component of said alcohol and metal hydroxide buffer solution comprises potassium hydroxide.

10. The process of claim 1, wherein said alcohol component of said alcohol and metal hydroxide buffer solution comprises an alcohol selected from the group consisting of methanol, ethanol, butanol and isopropanol.

11. The process of claim 1, wherein said absorber/scrubber apparatus includes a liquid absorbing solution, said liquid absorbing solution comprising an aqueous alcohol and a metal hydroxide, said metal hydroxide being the same as said metal hydroxide component of said alcohol and metal hydroxide buffer solution.

12. The process of claim 1, wherein said absorber/scrubber apparatus includes a liquid absorbing solution, said liquid absorbing solution comprising an aqueous alcohol and a metal hydroxide, said aqueous alcohol being the same as said alcohol component of said alcohol and metal hydroxide buffer solution.

13. The process of claim 1, wherein said fumigant component of said alkyl halide fumigant/air mixture is derived from a process other than a fumigation process.

14. The process of claim 1, wherein said alcohol and metal hydroxide buffer solution has an alcohol component with a mass fraction of greater than 0 up to about 1.

15. The process of claim 1, wherein said alcohol and metal hydroxide buffer solution has an aqueous component with a mass fraction of from about 0 to about 1.

16. The process of claim 1, wherein said metal hydroxide component of said alcohol and metal hydroxide buffer solution has a concentration in a range of greater than 0 g/100 ml of said alcohol and metal hydroxide buffer solution up to about 50 g/100 ml of said alcohol and metal hydroxide buffer solution.

17. The process of claim 1, wherein said fumigant component has a concentration in a range of greater than 0 g fumigant/g fumigant/air mixture up to about 0.25 g fumigant/g of fumigant/air mixture.

18. The process of claim 1, further comprising the steps of obtaining a lean air stream from said absorber/scrubber apparatus and releasing said lean air stream to atmosphere, wherein no further treatment steps are performed on said lean air stream prior to said releasing step.

19. Apparatus for capturing and converting fumigants, comprising:

first feeding means configured and arranged for feeding a buffer solution into an absorber/scrubber;

second feeding means configured and arranged for continuously feeding an alkyl halide fumigant/air mixture into said absorber/scrubber such that said alkyl halide fumigant/air mixture contacts said alcohol and metal hydroxide buffer solution, wherein at least a portion of said fumigant component of said alkyl halide fumigant/air mixture transfers from said alkyl halide fumigant/air mixture to said alcohol and metal hydroxide buffer solution to thereby create a reaction by which said fumigant component reacts with said metal hydroxide component of said alcohol and metal hydroxide buffer solution to yield a second mixture comprising product alcohol, unreacted metal hydroxide, and a metal halide;

an absorbing drum configured for feeding said second mixture from said absorber/scrubber to said absorbing drum and combining it with a small make-up stream, which contains absorbing alcohol, and a make-up alkali stream, which contains metal hydroxide and alcohol at a certain concentration, to form a discharge stream;

dividing means configured and arranged to divide said discharge stream into an absorbing solution stream and a purge stream, which comprises said unreacted metal hydroxide, said product alcohol and said metal halide;

return means configured and arranged to return said absorbing solution stream into said absorber/scrubber; and separating means configured and arranged for continuously separating said metal halide from said purge stream to yield solid metal halide.

20. The apparatus of claim 19, further comprising post-processing treatment means configured and arranged for treating a lean air stream discharged from said absorber/scrubber prior to its venting to atmosphere, said post-processing treatment means including measuring means for measuring any fumigant contained in said lean air stream.

21. The apparatus of claim 19, wherein said absorber/scrubber comprises a metallic cylindrical column.

22. The apparatus of claim 19, wherein said absorber/scrubber comprises a tray tower.

23. The apparatus of claim 19, wherein said absorber/scrubber comprises a packed column.

24. The apparatus of claim 19, wherein said absorber/scrubber is configured and arranged to be kept at a temperature of from about 20° C. to about 50° C.

25. The apparatus of claim 19, wherein said absorber/scrubber is configured and arranged to be kept at an operating pressure of at least about one atmosphere.

* * * * *